Jan. 13, 1953 M. B. SINGER 2,625,079
EYEGLASS FRAME CONSTRUCTION
Filed May 3, 1950 2 SHEETS—SHEET 1
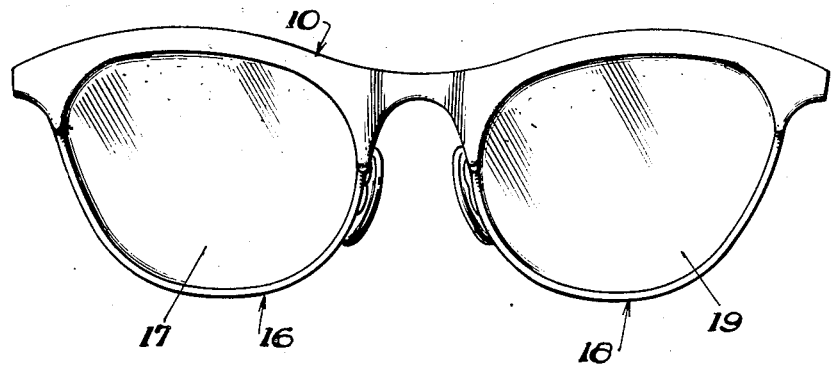
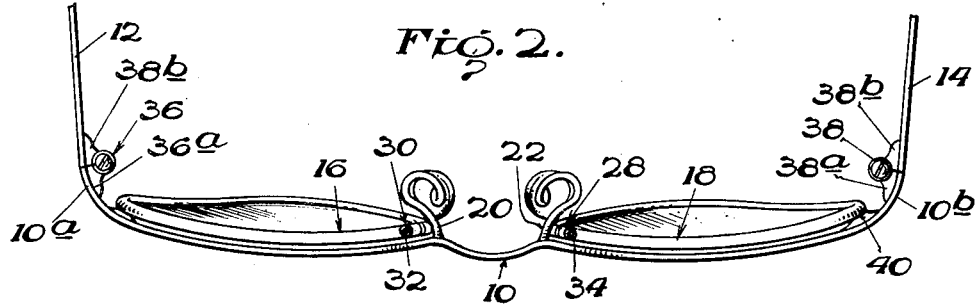
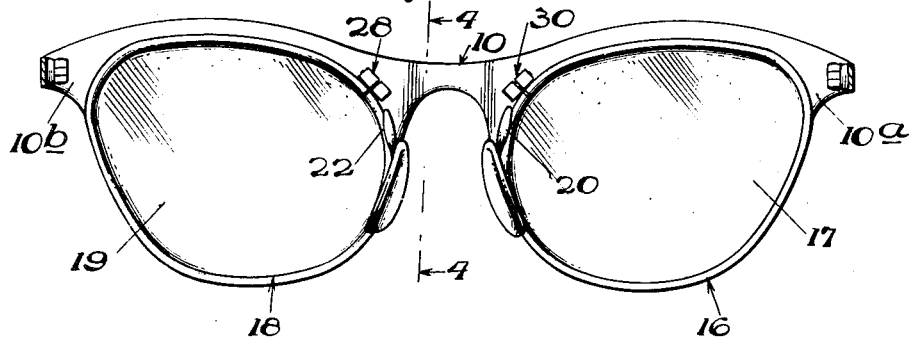
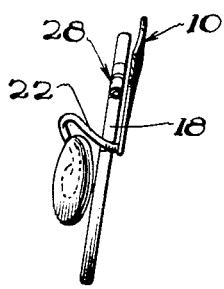
INVENTOR
Martin B. Singer.
BY O'Boyle + Blair
ATTORNEYS Jan. 13, 1953 M. B. SINGER 2,625,079
EYEGLASS FRAME CONSTRUCTION
Filed May 3, 1950 2 SHEETS—SHEET 2
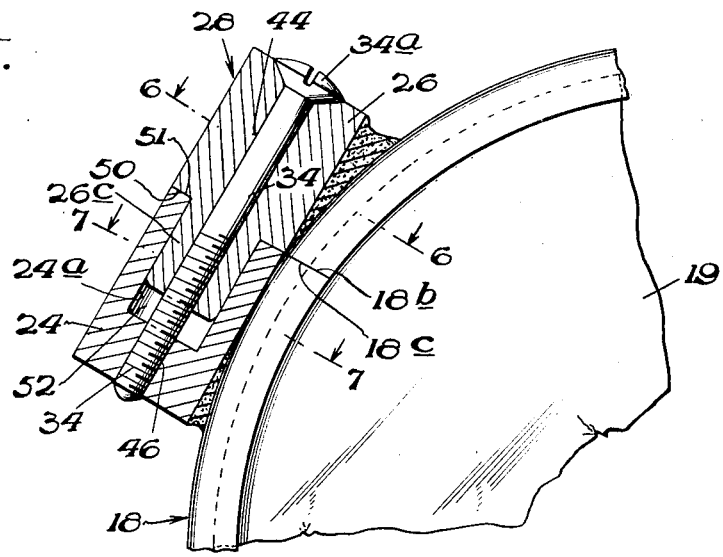
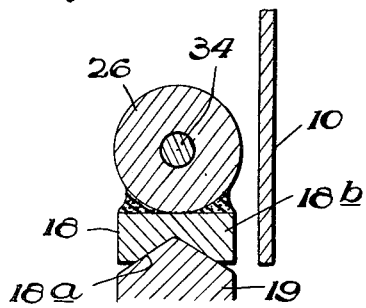
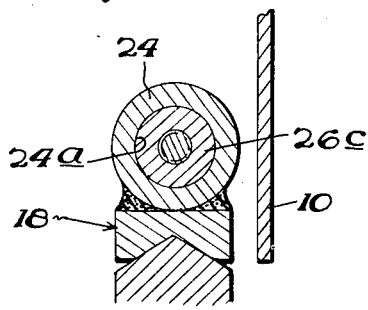
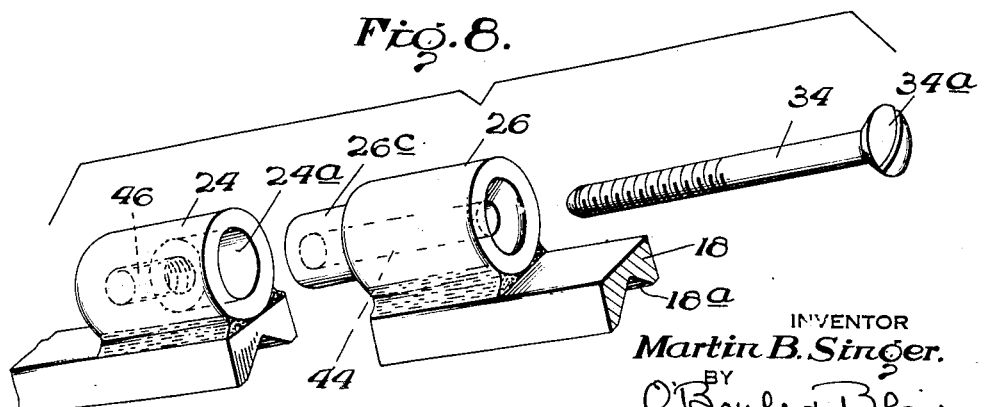
INVENTOR
*Martin B. Singer.*
BY
*O'Boyle & Blair*
ATTORNEYS Patented Jan. 13, 1953

2,625,079

UNITED STATES PATENT OFFICE 2,625,079

EYEGLASS FRAME CONSTRUCTION

Martin B. Singer, New York, N. Y., assignor to Harlequin Corporation, New York, N. Y.

Application May 3, 1950, Serial No. 159,765

3 Claims. (Cl. 88—41)

This invention relates to eyeglass frame construction.

Briefly, this construction includes a metal brow bar, generally indicated at 10, to the end portions 10a and 10b of which are hingedly connected a pair of temples 12 and 14. A pair of eye wires, generally indicated at 16 and 18 (Figure 3), are connected to brow bar 10 by nose pad arms 20 and 22 and soldered to brow bar end portions 10a and 10b. Each eye wire is split, the two ends in each eye wire being connected by screws 32 and 34 extending longitudinally through adjustable connectors, generally indicated at 28 and 30 (Figure 3). When screws 32 and 34 are removed, the eye wires may be spread, permitting the mounting of lenses 17 and 19 (Figure 1) therein.

One of the objects of this invention is to provide an eyeglass frame construction which is simple, practical, and thoroughly durable. Another object is to provide a construction of the above character which is neat and attractive in appearance. Another object is to provide a construction of the above character which may be manufactured from inexpensive materials without undue labor costs. Another object is to provide a construction of the above character which is so constructed that it will be able to withstand continuous hard usage. Still another object is to provide a construction of the above character in which oversized or undersized lenses may be mounted without affecting either the appearance or the degree of support provided for the lens by the frame. Other objects will be in part obvious and in part pointed out hereinafter.

The invention accordingly consists in the features of construction, combinations of elements, and arrangements of parts, all as will be illustratively described herein, and the scope of the application of which will be indicated in the following claims.

In the accompanying drawings, in which is shown one of the various possible embodiments of this invention, Figure 1 is a front elevation of the eyeglass frame;

Figure 2 is a top plan view of the eyeglass frame shown in Figure 1, the rear portions of the temple being broken away;

Figure 3 is a rear elevation of the frame shown in Figure 1;

Figure 4 is a vertical section taken on the line 4—4 of Figure 3;

Figure 5 is a vertical section on an enlarged scale taken through one of the eye wire adjustable connectors;

Figure 6 is a transverse section taken on the line 6—6 of Figure 5;

Figure 7 is a transverse section taken on the line 7—7 of Figure 5; and

Figure 8 is an exploded perspective view of the adjustable connector shown in Figure 5.

Similar reference characters refer to similar parts throughout the several views of the drawing.

It might here be noted that reference hereinafter to an "outward" direction signifies a direction to the left or right of the bridge of an eyeglass frame in the direction of the temples, while the term "inward" denotes a direction opposite thereto. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring to Figures 1 and 2, brow bar 10 is stamped from relatively heavy sheet metal, and its end portions, which curve rearwardly, are reinforced by having the plates 36a and 38a of hinges 36 and 38 soldered to their inner surfaces. The other hinge plates 36b and 38b of hinges 36 and 38 are soldered to the inner surfaces of the forward ends of temples 12 and 14. When the temples are in open position, as shown in Figure 2, the forward ends of temples 12 and 14 abut against the rear ends of end portions 10a and 10b.

As eye wires 16 and 18 are substantially similar in construction and in the manner in which they are connected to brow bar 10, detailed description will be limited to eye wire 18. Eye wire 18 is provided with a lens groove 18a (Figure 6) and is shaped to receive the bevelled edge of lens 19. The inner portion of rim 18 (Figure 3) is connected to brow bar 10 (Figure 4) by means of nose pad arm 22, nose pad arm 22 being soldered both to eye wire 18 and brow bar 10. It will be noted that the inner portion of eye wire 18 is mounted in spaced relationship with respect to brow bar 10 by arm 22, and also it will be noted that arm 22 is so positioned with respect to brow bar 10 (Figure 3) that it is hidden behind the brow bar when the frame is being worn. The outer portion of eye wire 18 is soldered to a downwardly extending portion 40 of the brow bar end portion 10b (Figure 2).

The free ends 18b and 18c of eye wire 18 (Figure 5) are secured together by adjustable connector 28, which includes connecting elements 24 and 26. Element 26 is cylindrically shaped, is soldered to the end portion 18b of eye wire 18, and element 26 is provided with a cylindrically-shaped extension 26c. A hole 44, longitudinally aligned with the axis of extension 26c, extends through element 26.

Connecting element 24 (Figures 7 and 8) is also cylindrically shaped, is soldered to the other end portion 18c of eye wire 18, and is provided with a bore 24a, the diameter of which is slightly larger than the diameter of cylindrically-shaped portion 26c of element 26. When the frame is assembled, the axis of bore 24a is so positioned that it may be readily aligned with the axis of cylindrically-shaped extension 26c, and thus extension 26c enters bore 24a when connecting elements 24 and 26 are moved toward each other. A threaded hole 46 (Figures 5 and 8), the axis of which is longitudinally aligned with respect to the axis of bore 24a, extends through securing element 24 and is adapted to receive a screw 34 positioned in hole 44 in element 26. The head 34a of screw 34 bears against the upper surface of element 26, and as screw 34 is turned, it draws element 26 toward element 24.

To mount lens 19 within eye wire 18, its edge is first positioned in the eye wire lens groove and then screw 34 is tightened. If the lens is of exactly the correct size, then shoulder 51 on element 24 engages seat 51 on element 26 (Figure 5). At this time, there is space 52 between the bottom of bore 24a and the end of extension 26c. Thus, if a lens is cut slightly undersize, the diameter of the eye wire can be reduced to fit such a lens by filing the eye wire and shoulder 51 before connecting elements 24 and 26 by screw 34. If a lens is oversize, then the cylindrically-shaped extension 26c enters bore 24a only a slight distance. Thus, this connection is so designed that it can accommodate oversize and undersize lenses, and the coaction between extension 26c and bore 24a insures proper alignment between the two ends of eye wire 18. Because the adjustable connectors are positioned behind brow bar 10, it is hidden and thus cannot detract from the appearance of the frame.

Thus it will be seen that a frame has been disclosed which is well able to withstand the strains of continuous hard usage. The nose pads of this frame are so mounted that they are readily adjustable but are hidden behind the eye wires. The eye wires are so mounted upon the brow bar that both oversize and undersize lenses may be readily mounted upon them. It should also be noted that this frame is so constructed that shocks upon the endpiece portions of the frame, which are the shocks which usually cause the greatest amount of damage, are absorbed by the brow bar which protects the lenses. It will thus be seen that a simple and practical eyeglass frame has been disclosed in which the several objects hereinabove mentioned as well as many others have been successfully accomplished.

As many possible embodiments may be made of the above invention, and as many changes might be made in the embodiments above set forth, it is to be understood that all matter hereinbefore set forth or shown in the accompanying drawings is to be interpreted as illustrative and not in a limiting sense.

What is claimed is:

1. In eyeglass frame construction, in combination, a brow bar extending across the front of said frame, said brow bar being made as an integral element from flat sheet metal and extending from one endpiece portion of said frame across its front to the other endpiece portion, said brow bar including a pair of depending portions adjacent its endpiece portions, a pair of temples connected by hinges to said endpiece portions, a pair of eye wires, each of said eye wires having a peripheral portion extending from one end portion of the frame inwardly thereof and longitudinally of said brow bar, said peripheral portion of said eye wires lying substantially within the projected area of said brow bar when viewed directly from the front thereof, means connecting said eye wires to the outer depending portions of said brow bar rearwardly thereof, a pair of nose pad arms connected to said brow bar having nose pads mounted thereon, and means connecting said eye wires to said nose pad arms at points spaced rearwardly from said brow bar.

2. An eyeglass frame comprising a brow bar extending across the front of said frame, said brow bar being formed as an integral element from flat sheet metal and extending from one end portion of the frame to the other end portion, the end portions of said brow bar thereby defining the end portions of said frame, a pair of temples connected to the end portions of said brow bar, a pair of eye wires, each of said eye wires having a peripheral portion extending from one end portion of the frame inwardly thereof and longitudinally of said brow bar, said peripheral portion of said eye wires lying substantially within the projected area of said brow bar when viewed directly from the front thereof, a pair of laterally spaced nose pad arms directly connected to adjacent inner portions of said peripheral portions of said eye wires, and means connecting each of said eye wires to said brow bar rearwardly thereof and in spaced relation therewith, said means comprising at least a pair of laterally spaced connecting portions interposed between each of said eye wire peripheral portions and adjacent portions of the rear face of said brow bar whereby said eye wires are secured to said brow bar in spaced relation therewith and rearwardly thereof.

3. An eyeglass frame comprising a brow bar extending across the front of said frame, said brow bar being formed as an integral element from flat sheet metal and extending from one end portion of the frame to the other end portion, the end portions of said brow bar thereby defining the end portions of said frame, a pair of temples connected to the end portions of said brow bar, a pair of eye wires, each of said eye wires having a peripheral portion extending from one end portion of the frame inwardly thereof and longitudinally of said brow bar, said peripheral portion of said eye wires lying substantially within the projected area of said brow bar when viewed directly from the front thereof, a pair of laterally spaced nose pad arms connected to adjacent inner portions of said peripheral portions of said eye wires, and means connecting outer portions of each of said eye wire peripheral portions to outer portions of said brow bar in spaced relation therewith, each of said eye wire peripheral portions having an inner portion thereof in fixed relation with an adjacent inner portion of said brow bar in spaced relation therewith whereby said eye wires are secured to said brow bar in spaced relation therewith and rearwardly thereof.

MARTIN B. SINGER.

REFERENCES CITED

The following references are of record in the file of this patent:

UNITED STATES PATENTS

| Number | Name | Date |
| --- | --- | --- |
| 2,062,342 | Wells | Dec. 1, 1936 |
| 2,155,693 | Tannasso et al. | Apr. 25, 1939 |
| 2,299,708 | Bosworth | Oct. 20, 1942 |
| 2,356,148 | Cozzens et al. | Aug. 22, 1944 |
| 2,495,508 | Cleaver | Jan. 24, 1950 |

FOREIGN PATENTS

| Number | Country | Date |
| --- | --- | --- |
| 430,432 | Great Britain | June 19, 1935 |